United States Patent
Fang et al.

(10) Patent No.: US 9,251,056 B2
(45) Date of Patent: Feb. 2, 2016

(54) BUCKET-BASED WEAR LEVELING METHOD AND APPARATUS

(71) Applicants: Po-Chao Fang, Hsinchu (TW); Cheng-Yuan Wang, Taipei (TW); Hsiang-Pang Li, Zhubei (TW); Chi-Hao Chen, Kaohsiung (TW); Pi-Cheng Hsiu, Kaohsiung (TW); Tei-Wei Kuo, New Taipei (TW)

(72) Inventors: Po-Chao Fang, Hsinchu (TW); Cheng-Yuan Wang, Taipei (TW); Hsiang-Pang Li, Zhubei (TW); Chi-Hao Chen, Kaohsiung (TW); Pi-Cheng Hsiu, Kaohsiung (TW); Tei-Wei Kuo, New Taipei (TW)

(73) Assignee: Macronix International Co., Ltd., Hsinchu (TW)

( * ) Notice: Subject to any disclaimer, the term of this patent is extended or adjusted under 35 U.S.C. 154(b) by 139 days.

(21) Appl. No.: 13/646,426

(22) Filed: Oct. 5, 2012

(65) Prior Publication Data

US 2013/0326148 A1    Dec. 5, 2013

Related U.S. Application Data

(60) Provisional application No. 61/654,301, filed on Jun. 1, 2012.

(51) Int. Cl.
*G06F 12/12* (2006.01)
*G06F 12/02* (2006.01)
*G06F 12/10* (2006.01)

(52) U.S. Cl.
CPC ........ *G06F 12/0246* (2013.01); *G06F 12/1009* (2013.01); *G06F 2212/7211* (2013.01)

(58) Field of Classification Search
CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84
See application file for complete search history.

(56) References Cited

U.S. PATENT DOCUMENTS

| | | | | |
|---|---|---|---|---|
| 6,000,006 | A * | 12/1999 | Bruce et al. | 711/103 |
| 2007/0208904 | A1 * | 9/2007 | Hsieh et al. | 711/103 |
| 2008/0183947 | A1 * | 7/2008 | Shone et al. | 711/103 |
| 2008/0301256 | A1 * | 12/2008 | McWilliams et al. | 709/214 |
| 2010/0023675 | A1 * | 1/2010 | Chen et al. | 711/103 |

(Continued)

OTHER PUBLICATIONS

Zhou P. et al., "A durable and Energy Efficient Main Memory Using Phase Change Memory Technology," Proc. 36th Annual Int'l Symp. on Computer Architecture (ISCA '09), Jun. 2009, Austin, TX, pp. 14-23.

(Continued)

*Primary Examiner* — Jared Rutz
*Assistant Examiner* — Jean Edouard
(74) *Attorney, Agent, or Firm* — Yiding Wu; Haynes Beffel & Wolfeld LLP

(57) ABSTRACT

A method for memory management is provided for a memory including a plurality of pages. The method comprises assigning in-use pages to in-use buckets according to use counts. The in-use buckets include a low in-use bucket for a lowest range of use counts, and a high in-use bucket for a highest range of use counts. The method comprises assigning free pages to free buckets according to use counts. The free buckets include a low free bucket for a lowest range of use counts, and a high free bucket for a highest range of use counts. The method maintains use counts for in-use pages. On a triggering event for a current in-use page, the method determines whether the use count of the current in-use page exceeds a hot swap threshold, and if so moves data in the current in-use page to a lead page in the low free bucket.

20 Claims, 8 Drawing Sheets

(56) References Cited

U.S. PATENT DOCUMENTS

| | | | |
|---|---|---|---|
| 2010/0088461 A1* | 4/2010 | Yang et al. | 711/103 |
| 2010/0174845 A1* | 7/2010 | Gorobets et al. | 711/103 |
| 2010/0332725 A1* | 12/2010 | Post et al. | 711/103 |
| 2011/0055458 A1* | 3/2011 | Kuehne | 711/103 |
| 2011/0238892 A1* | 9/2011 | Tsai et al. | 711/103 |
| 2012/0173797 A1* | 7/2012 | Shen | 711/103 |
| 2012/0284587 A1* | 11/2012 | Yu et al. | 714/773 |
| 2012/0317345 A1* | 12/2012 | Pan et al. | 711/103 |
| 2013/0145085 A1* | 6/2013 | Yu et al. | 711/103 |
| 2013/0311707 A1* | 11/2013 | Kawamura et al. | 711/103 |

OTHER PUBLICATIONS

Qureshi M.K. et al., "Scalable High Performance Main Memory System Using Phase-Change Memory Technology," Proc. 36th Annual Int'l Symp. on Computer Architecture (ISCA '09), Jun. 2009, Austin, TX, pp. 24-33.

Condit J. et al., "Better I/O Through Byte-Addressable, persistent Memory," Proc. of the ACM SIGOPS 22nd Symp. on Operating Systems Principles (SOSP '09) Oct. 2009, Big Sky, Montata, 14pp.

Smullen C.W. et al., "Accelerating Enterprise Sollid-State Disks with Non-Volatile Merge Caching," Proc. Int'l Conf. on Green Computing (GREENCOMP '10) Chicago, IL, Aug. 2010, pp. 203-214.

Qureshi M.K. et al. "Improving Read Performance of Phase Change Memories via Write Cancellation and Write Pausing," IEEE 16th Int'l Symp. High Performance Computer Architecture (HPCA), Bangalore, Jan. 2010, pp. 1-11.

Lee B.C. et al., Architecting Phase Change Memory as a Scalable DRAM Alternative, Proc. 36th Annual Int'l Symp. on Computer Architecture (ISCA '09), Austin, TX, Jun. 2009, pp. 2-13.

Schechter S. et al., "Use ECP, not ECC, for Hard Failures in Resistive Memories," Proc. 37th Annual Int'l Symp. on Computer Architecture (ISCA '10) Saint-Malo, France, Jun. 2010, 12 pp.

Qureshi M.K. et al., "Enhancing Lifetime and Security of PCM-Based Main Memory with Start-Gap Wear Leveling," Proc. 42nd Annual IEEE/ACM Int'l Symp. on Microarchitecture (MICRO '09) New York, NY, Dec. 2009, pp. 14-23.

Ferreira A.P. et al., "Increasing PCM Main Memory Lifetime," Proc. of the Conference on Design, Automation and Test in Europe (DATE '10) Dresden, Mar. 2010, pp. 914-919.

Chen C-H et al., "Age-Based PCM Wear Leveling with Nearly Zero Search Cost," 49th ACM/EDAC/IEEE Design Automation Conference (DAC), San Francisco, Jun. 2012, pp. 453-458.

Zhang W. et al., "Exploring Phase Change Memory and 3D Die-Stacking for Power/Thermal Friendly, Fast and Durable Memory Architectures," Proc. of the IEEE PACT, pp. 101-112, 2009.

Yoon D.H. et al. "FREE-p: Protecting Non-volatile Memory against both Hard and Soft Errors," Proc. of the IEEE HPCA, pp. 466-477, 2011.

Seong N.H. et al., "Security Refresh: Prevent Malicious Wear-Out and Increase Durability for Phase-Change Memory with Dynamically Randomized Address Mapping," Proc. of the IEEE/ACM ISCA, pp. 383-394, 2010.

Qureshi M. et al., "Practical and Secure PCM Systems by Online Detection of Malicious Write Streams," Proc. of the IEEE HPCA, pp. 478-489, 2011.

Jiang L. et al., "Cooperative Integration of Wear-Leveling and Salvaging for PCM Main Memory," Proc. of the IEEE/IFIP DSN, pp. 221-232, 2011.

Hu J. et al., "Reducing Write Activities on Non-volatile Memories in Embedded CMPs via Data Migration and Recomputation," Proc. of the IEEE/ACM DAC, pp. 350-355, 2010.

Gal E. et al., "Algorithms and Data Structures for Flash Memories," ACM Computing Surveys, 37(2):138-163, 2005.

Ferreira A.P. et al., "Using PCM in Next-generation Embedded Space Applications," Proc. of the IEEE RTAS, pp. 153-162, 2010.

Cho S. et al., "Flip-N-Write: A Simple Deterministic Technique to Improve PRAM Write Performance, Energy and Endurance," Proc. of the IEEE/ACM Micro, pp. 347-357, 2009.

Chang Y.-H. et al., "Endurance Enhancement of Flash-Memory Storage Systems: An Efficient Static Wear Leveling Design," Proc. of the IEEE/ACM DAC, pp. 212-217, 2007.

Chang L.-P. et al., "An Adaptive Striping Architecture for Flash Memory Storage Systems of Embedded Systems," Proc. of the IEEE RTAS, pp. 187-196, 2002.

\* cited by examiner

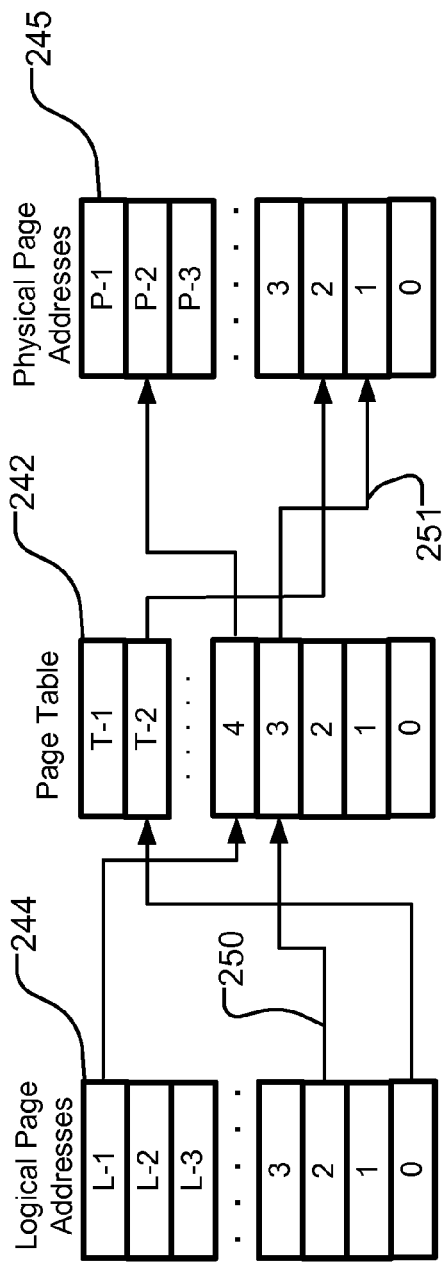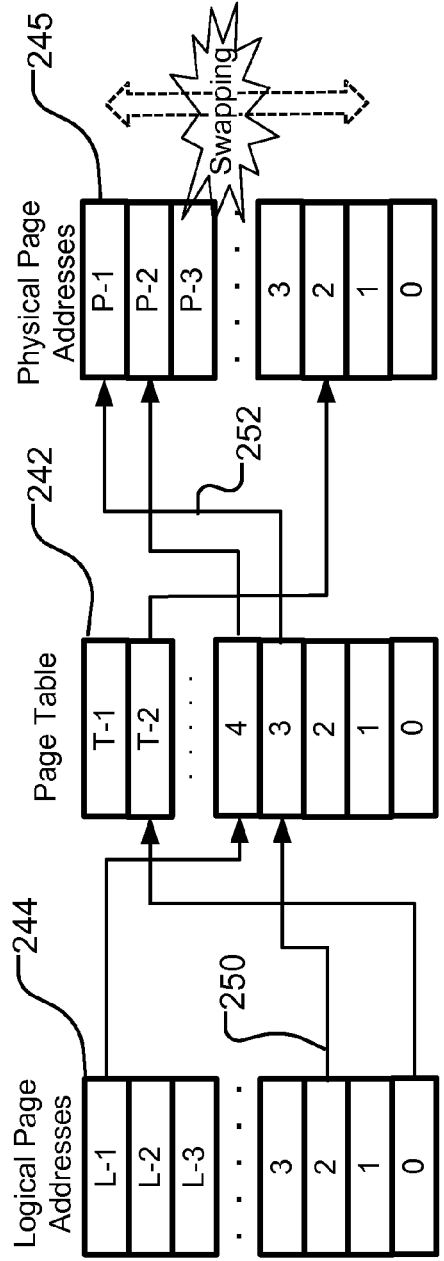

BUCKET-BASED WEAR LEVELING METHOD AND APPARATUS

RELATED APPLICATIONS

This application claims benefit of U.S. Provisional Patent Application No. 61/654,301, filed 1 Jun. 2012, which application is incorporated by reference as if fully set forth herein.

BACKGROUND OF THE INVENTION

1. Field of the Invention

The present inventi on relates to memory devices and systems including memory management.

2. Description of Related Art

Nonvolatile memory has write/erase endurance limitations. Without memory management with regard to use counts, the memory may wear out prematurely or even cause system failure. Wear leveling for memory management is an approach to increase endurance of nonvolatile memory. Implementation of an effective wear leveling algorithm may consume memory space, increase operating complexity, and cause system overhead and latency. Therefore, it is important to balance the trade-offs between low latency and effective wear leveling. Write/erase endurance limitations for nonvolatile memory such as phase change material based memory can be about $10^6$-$10^9$, lower than those of dynamic random access memories (DRAM) which can be more than $10^{15}$. Consequently, it can be more important to have effective wear leveling algorithms for nonvolatile memory to be used in high endurance environments like those normally limited to DRAM.

It is desirable to provide an effective wear leveling design that has low computational complexity and low latency, and that can be compatible with existing virtual addressing schemes used for memory management.

SUMMARY

A method for memory management for a memory including a plurality of pages can provide for wear leveling of nonvolatile memory, including phase change memory. The method comprises assigning in-use pages to in-use buckets according to use counts, where the buckets are data structures supporting the method. The in-use buckets include a low in-use bucket for a lowest range of use counts, and a high in-use bucket for a highest range of use counts. The method comprises assigning free pages to free buckets according to use counts. The free buckets include a low free bucket for a lowest range of use counts, and a high free bucket for a highest range of use counts. The method maintains use counts for in-use pages. On a triggering event for a particular page that is in use, the method determines whether the use count of the particular page exceeds a hot swap threshold, and if so moves data in the particular page to a target page in the low free bucket, changes the status of the particular page from in-use to free, changes the status of the target page from free to in-use, and adds that now in-use target page to an in-use bucket. The particular page is also added to a free bucket. Other wear leveling processes can be executed as well, using the bucket structure. A system implementing the wear leveling processes is also described.

Other aspects and advantages of the present invention can be seen on review of the drawings, the detailed description and the claims, which follow.

BRIEF DESCRIPTION OF THE DRAWINGS

FIGS. 2A-2B illustrate modifications on entries in a page table for address remapping incurred by wear leveling.

DETAILED DESCRIPTION

A detailed description of embodiments of the wear leveling technology is provided with reference to the FIGS. 1-8.

Figure 1:
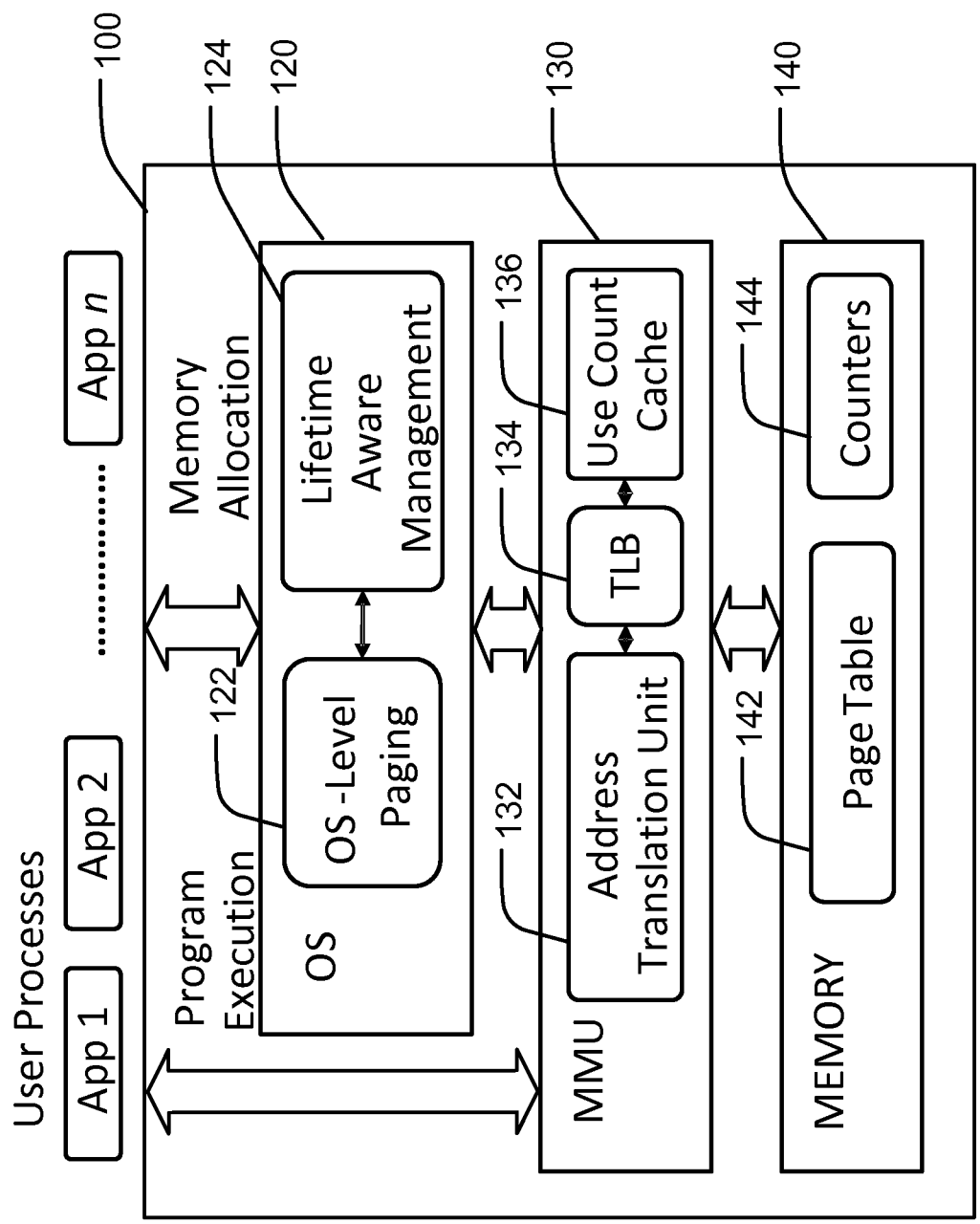
FIG. 1 is a block diagram of an example memory management system.

FIG. 1 is a block diagram of an example memory management system 100 using a method for memory management for a memory including a plurality of pages. The system interfaces with user processes such as App 1, App 2, and App n. The system performs program execution and memory allocation according to the user processes. The system includes an operating system 120 (OS), a memory management unit 130 (MMU), and memory 140. The operating system 120 includes OS-level paging 122, and lifetime aware management 124, and communicates with the memory management unit 130. The memory management unit 130 includes an address translation unit 132, a translation lookaside buffer 134 (TLB), and a use count cache 136, and communicates with the memory 140. The memory 140 may include a plurality of pages including pages based on phase change memory (PCM), a page table 142 and counters 144. The lifetime aware management 124 comprises logic to direct wear leveling processes in cooperation with the logical addressing or virtual addressing scheme employed by the OS. The lifetime aware management 124 can be implemented as a feature of the OS, or as an add-on memory driver program, for example.

In this example, the OS maintains a translation lookaside buffer 134 (TLB) for addressing pages in the memory, and in cooperation with the lifetime aware management 124, maintains the use count cache 136 that includes entries for pages resident in the TLB. In other embodiments, the use count cache 136 can be independent of the TLB logic.

The translation lookaside buffer 134 can be a small and fast cache that speeds up address translation time by caching the page and frame numbers, for example, of the most recently used pages. Thus, it provides an efficient way to identify in-use pages in support of wear leveling processes.

Counters 144 calculate use counts of physical pages in the memory. The use counts for the physical pages may be write counts or erase counts. A physical page with a use count lower than that of another physical page is called "younger" than the other physical page for the purpose of this description. Conversely, the other physical page is called "older" than a physical page having a lower use count.

The use count cache 136 records the use counts produced by the counters 144 for pages having entries in the use count cache, which in this example include pages resident in the TLB. The use counts for pages not resident in the use count cache are maintained in this example by assigning them to "buckets" which have corresponding use count ranges associated with them. When pages are moved into and out of the use count cache 136, an initial use count can be approximated for the page, based on the range associated with its bucket.

The use count cache 136 can be used to avoid frequent counter updates on every page in nonvolatile memory such as PCM-based memory. The use count cache 136 may be in the memory management unit 130. The lifetime aware management 124 decides how to allocate and swap pages in the memory to enhance the memory endurance. Using the OS-level paging 122 in the operating system 120, address remapping incurred by page allocation and swapping can be performed by modifying corresponding entries in the page table 142. Using the lifetime aware management 124, a young page can be acquired when page allocation or page swapping needs to be performed without searching or sorting pages in the memory 140. A young page thus acquired may be a physical page from among physical pages within a lowest range of use counts.

FIGS. 2A-2B illustrate modifications on entries in a page table for address remapping incurred by wear leveling. The Figures illustrate a list of logical page addresses 244, a list of entries in a page table 242, and a list of physical page addresses 245. A page table 242, such as the page table 142 shown in FIG. 1, may be a data structure used by the operating system 120 to store the mapping between logical page addresses and physical page addresses. The translation lookaside buffer 134 stores a cache of recently used mappings from the page table 142. When a logical page address needs to be translated into a physical page address, the operating system 120 first searches the translation lookaside buffer 134. If a match is found, the translation lookaside buffer 134 returns the physical page address, and the operating system 120 may continue with memory access. If a match is not found, the operating system 120 may look up the address mapping in the page table 142. If the page table 142 returns the physical page address, the operating system 120 may write the physical page address to the translation lookaside buffer 134 to track recently used mappings, and then continue with memory access.

As illustrated in FIGS. 2A and 2B, the list of logical page addresses 244 ranges from 0 to L−1 where L is the total number of logical page addresses in the system. The list of physical page addresses 245 ranges from 0 to P−1 where P is the total number of physical page addresses in the system. The page table 242 has entries ranging from 0 to T−1 where T is the total number of entries in the page table.

In reference to FIG. 2A, entries T−2, 3, and 4 in the page table 242 map logical page addresses 0, 2, and L−1 to physical page addresses 2, 1, and P−2, respectively. Thus, the page at logical page address 2 is mapped to physical address 1, and is an in-use page. An in-use page is a page having data, while a free page is a page not having any data, having invalid data or having erased data. The page at physical address P−1 is a free page.

The wear leveling procedure as mentioned above can be executed in coordination with the logical addressing. Thus, if it is determined that the use count of the current in-use page at physical address 1 exceeds a hot swap threshold, the data at physical address 1 can be moved to the free page at physical page address P−1. The hot swap threshold is further described in connection with FIG. 4. FIG. 2B illustrates the result of moving data from physical page address 1 to physical address P−1, while not changing the corresponding logical page address. In FIG. 2A, entry 3 in the page table 242 maps logical address 2 (arrow 250) to physical page 1 (arrow 251). After swapping as shown in FIG. 2B, entry 3 in the page table 242 maps logical address 2 (arrow 250) to physical page 1 (arrow 252). The physical page at physical address P−1 now has the data moved from the physical page at physical address 1, while the physical page at physical address 1 is now freed. Consequently, in-use pages with use counts exceeding the hot swap threshold can be swapped with free pages which have lower use counts, improving write/erase endurance of the nonvolatile memory.

Figure 3:
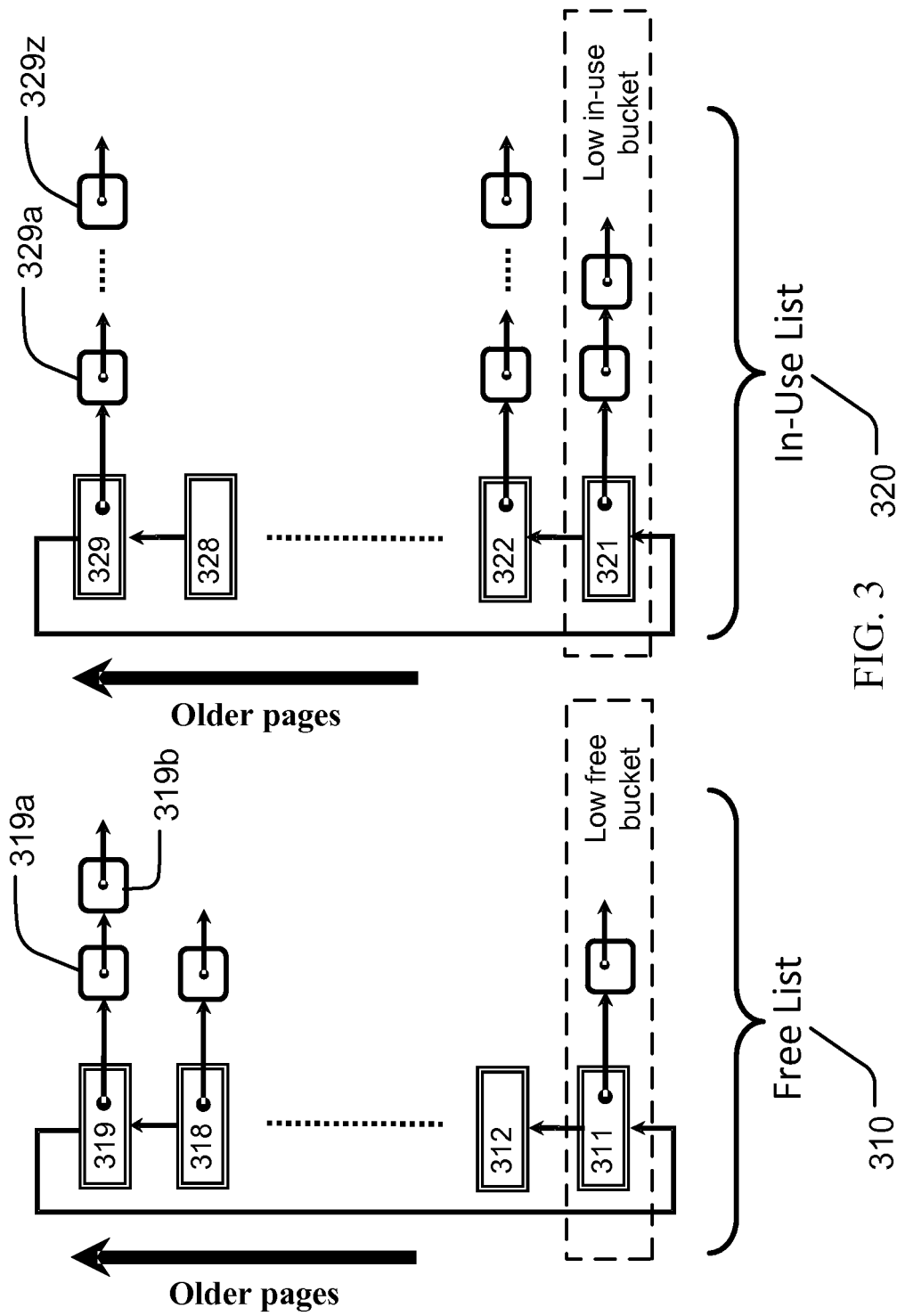
FIG. 3 illustrates an example data structure.
Figure 4:
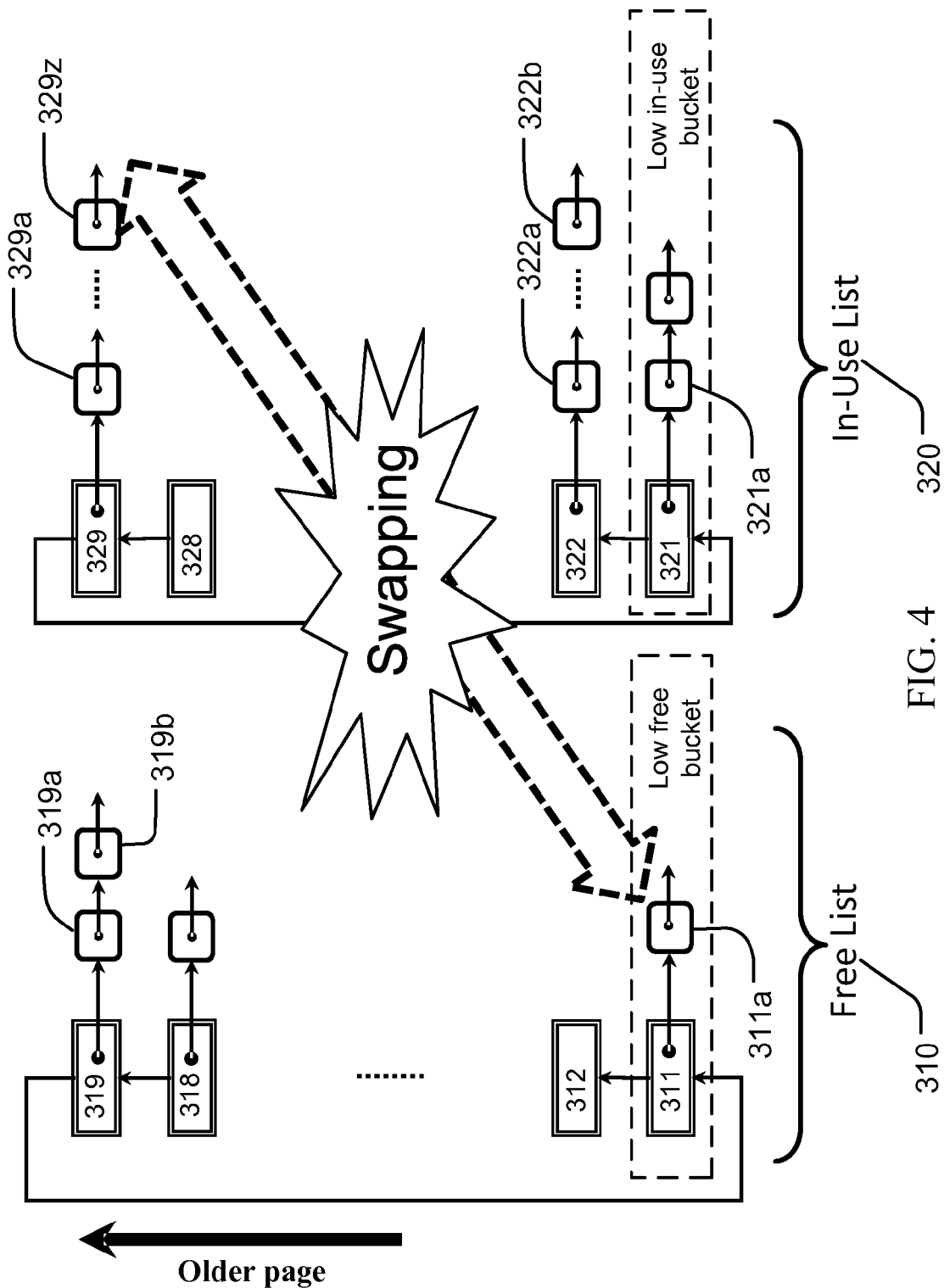
FIG. 4 illustrates dynamic wear leveling for swapping hot pages.
Figure 5:
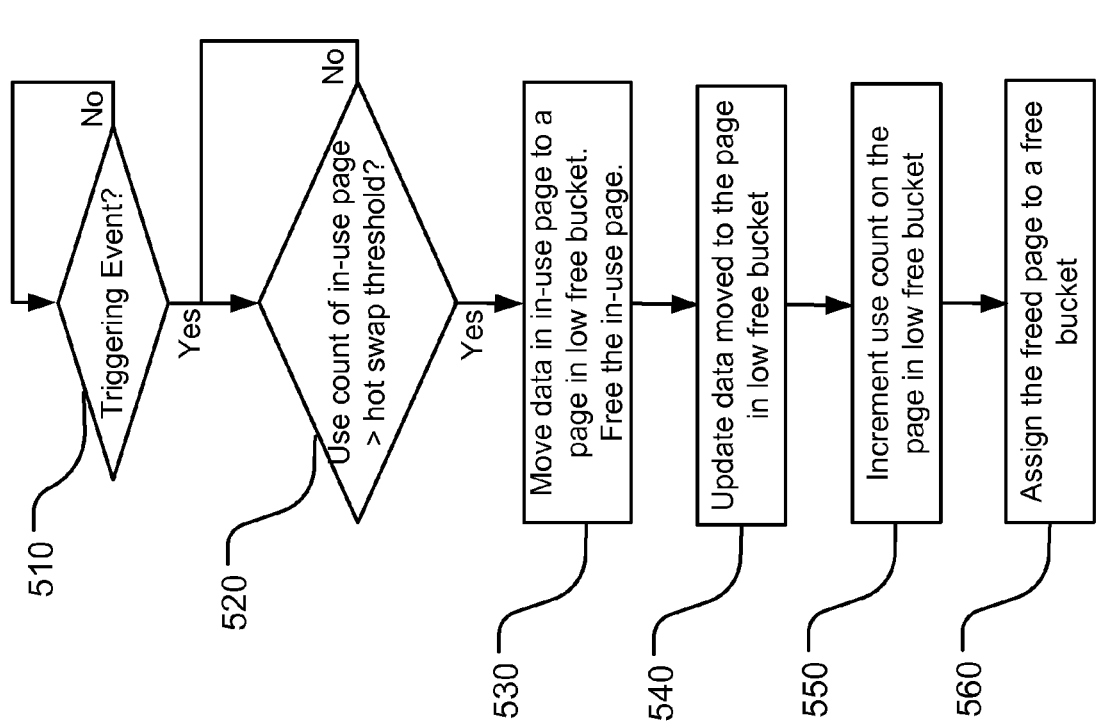
FIG. 5 is a flow chart for dynamic wear leveling.

FIGS. 3-5 illustrate a method for memory management for a memory including a plurality of pages. The method includes assigning in-use pages to in-use buckets according to use counts, assigning free pages to free buckets according to use counts, and maintaining use counts for in-use pages. The method includes dynamic wear leveling for swapping hot pages, and static wear leveling for swapping cold pages.

FIG. 3 illustrates an example data structure underlying the method for memory management. Pages in the plurality of pages are categorized as in-use pages or free pages and assigned to in-use or free "buckets" to classify pages according to their use counts, and to identify younger and older pages. In-use pages are maintained in in-use buckets. Free pages are maintained in free buckets. The in-use buckets can be implemented using linked lists of pages including lead pages and last pages. The free buckets can be implemented using linked lists of pages including lead pages and last pages. The data structure includes an in-use list of buckets to manage in-use pages, and a free list of buckets to manage free pages. The in-use list of buckets and the free list of buckets can include the same number of buckets or a different number of buckets as suits a particular implementation. In this example, the in-use list maintains a list of a number N buckets of in-use pages. The free list maintains a list of N buckets of free pages. Each bucket on one list corresponds to a bucket on the other list. Buckets that maintain the current youngest free pages and in-use pages are referred to as the free base bucket or low free bucket, and the in-use base bucket or low in-use bucket, respectively.

As illustrated in FIG. 3, the data structure includes an in-use list 320 and a free list 310. The in-use list 320 links in-use buckets, such as in-use buckets 321, 322, . . . , 328, and 329, into which in-use pages may be assigned according to use counts. The use counts may be erase counts or write counts of each page. Pages in the same in-use bucket have use counts falling in the range of use counts assigned to that bucket. Each in-use bucket may be assigned multiple in-use pages, and the in-use pages inside an in-use bucket may be linked together starting with a lead page and ending with a last page. For instance, the in-use bucket 329 is assigned in-use pages from a lead in-use page 329a through a last in-use page 329z. The in-use pages inside the in-use bucket 329 are linked together, starting with the lead in-use page 329a and ending with the last in-use page 329z. The in-use buckets may include a low in-use bucket, such as the in-use bucket 321, for a lowest range of use counts, and a high in-use bucket, such as the in-use bucket 329, for a highest range of use counts. The in-use list 320 maintains the in-use buckets in order of ranges of use counts, increasing from the low in-use bucket to the high in-use bucket. For instance, the low in-use bucket 321 may have a range of use counts of 0-1000, the high in-use bucket may have a range of use counts of 9001-10000, and the in-use buckets in-between them may have ranges of use counts 1001-2000, 2001-3000, 3001-4000, etc. Older pages are pages with higher use counts, and are assigned to in-use buckets farther away from the low in-use bucket, and closer to or in the high in-use bucket. An in-use bucket may be empty, such as the in-use bucket 328. The in-use list 320 is linked in a circular format such that the high in-use bucket is linked back to the low in-use bucket. The low in-use bucket may become empty eventually, because pages in the low in-use bucket are gradually moved to other buckets. When the low in-use bucket, such as the in-use bucket 321, runs out of pages, the in-use list 320 may rotate such that the in-use bucket 322 becomes the low in-use bucket, while the in-use bucket 321 becomes the high in-use bucket, changing the range of use counts associated with the buckets as needed.

The free list 310 links free buckets, such as 311, 312, . . . , 318, and 319, into which free pages may be assigned according to use counts. As described herein, the use counts may be erase counts or write counts of each page. Pages in the same free bucket have the same range or use counts. Each free bucket may be assigned multiple free pages, and the free pages inside a free bucket may be linked together starting with a lead page and ending with a last page. For instance, the free bucket 319 is assigned a lead free page 319a, a last free page 319b, etc. The free pages inside the free bucket 319 are linked together, starting with the lead free page 319a and ending with the last free page 319b. The free buckets may include a low free bucket, such as the free bucket 311, for a lowest range of use counts, and a high free bucket, such as the free bucket 319, for a highest range of use counts. Older pages are assigned to free buckets farther away from the low free bucket, and closer to or in the high free bucket. A free bucket may be empty, such as the free bucket 312. The free list 310 is linked in a circular format such that the high free bucket 319 is linked back to the low free bucket 311. The low free bucket may become empty eventually, because pages in the low free bucket are gradually moved to other buckets. When the low free bucket, such as the free bucket 311, runs out of pages, the free list 310 may rotate such that the free bucket 312 becomes the low free bucket, while the free bucket 311 becomes the high free bucket.

In operation, the method assigns in-use pages to in-use buckets, such as in-use buckets 321-329, according to use counts. The in-use buckets include a low in-use bucket, such as in-use bucket 321, for a lowest range of use counts, and a high in-use bucket for a highest range of use counts, such as in-use buckets 329. The method assigns free pages to free buckets, such as free buckets 311-319, according to use counts. The free buckets include a low free bucket, such as free bucket 311, for a lowest range of use counts, and a high free bucket, such as free bucket 319, for a highest range of use counts.

The method maintains use counts for in-use pages. The method can maintain the use counts using the use count cache 136 shown in FIG. 1. The use count in an entry for a page may be incremented on an erase of data or a write of data in the page. The entry for a page may be in the use count cache 136. For instance, the use count in the entry for the last in-use page 329z is incremented on an erase of data in the last in-use page 329z. The use count in an entry for a page may also be incremented on a write of data in the page.

FIG. 4 illustrates dynamic wear leveling for swapping hot pages. In this example, the last in-use page 329z can have a high use count, and therefore be considered a hot page. Upon a triggering event, such as being subject of a read or write access, this high use count can be detected. Swapping hot pages includes moving data in hot pages maintained by the in-use list 320 to younger pages maintained by the free list 310. If the last in-use page 329z satisfies a hot swap condition, such as a threshold relative use count, then the wear leveling algorithm can swap the data in the last in-use page 329z to a lead free page 311a in a low free bucket 311. In this way, the hot data is moved to a page having a lower use count.

FIG. 5 is a flow chart for dynamic wear leveling. In reference to FIG. 4 and FIG. 5, on a triggering event for a current in-use page (510), the method determines whether the use count of the last in-use page 329z exceeds a threshold, such as a hot swap threshold (520), and if so the method moves data in the last in-use page 329z to a page, such as a lead free page 311a, in the low free bucket 311, thus freeing the last in-use page 329z (530). The method then performs updates on the data moved to the low free bucket 311 (540), increments the use count on the lead free page 311a in the low free bucket 311 (550), and assigns the freed page to a free bucket 319 for a range of use counts corresponding to the in-use bucket 329 (560). The method maintains a use count cache 136 (FIG. 1), which has entries for in-use pages including use counts. The triggering event for the current in-use page can create an entry for the current in-use page in the use count cache. The hot swap threshold may be determined experimentally, assigned, and adjusted by the system using the memory in accordance with system requirements for factors such as relative use counts of the pages in the memory, the number of buckets, the granularity of wear leveling, and the complexity of the wear leveling method.

Figure 6:
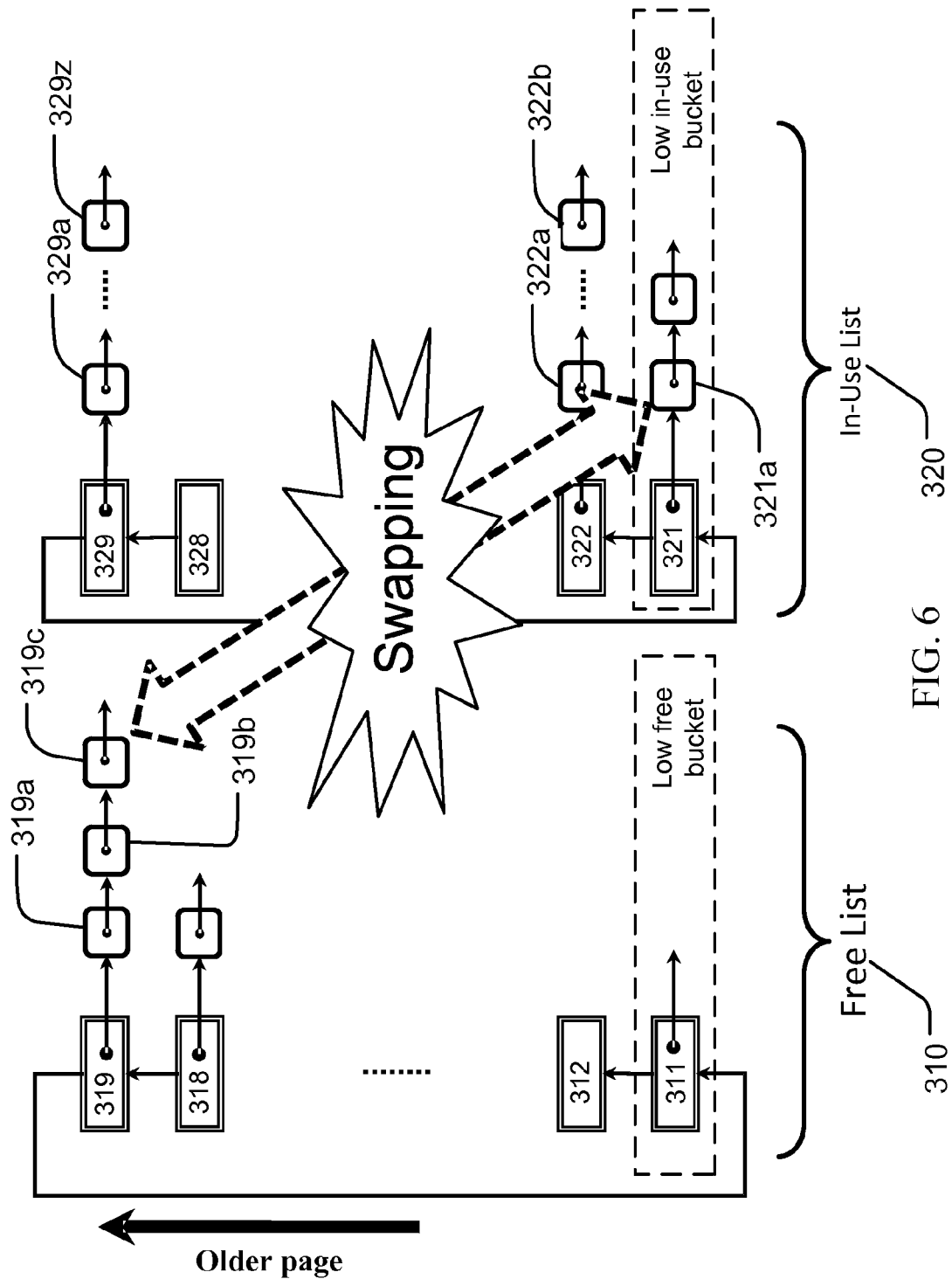
FIG. 6 illustrates static wear leveling for swapping cold pages.

FIG. 6 illustrates static wear leveling for swapping cold pages. Cold pages are pages that are infrequently updated in a nonvolatile memory, and thus are likely to cause poor page utilization by occupying fresh pages in the in-use list. Data in a cold page may be referred to as cold data. In this example, in-use page 321a in the low in-use bucket can have a low use count, and therefore be considered a cold page. Upon a triggering event, such as being subject of a read or write access, this low use count can be detected. Swapping cold pages includes moving data in cold pages maintained by the in-use list 320 to older pages maintained by the free list 310. If in-use page 321a satisfies a cold swap condition, such as a threshold relative use count, then the wear leveling algorithm can swap the data in in-use page 321a to a last free page 319c in a high free bucket 319. In this way, the cold data is moved from a page having a lower use count, freeing that low use count page for use by other, more active logical pages.

Figure 7:
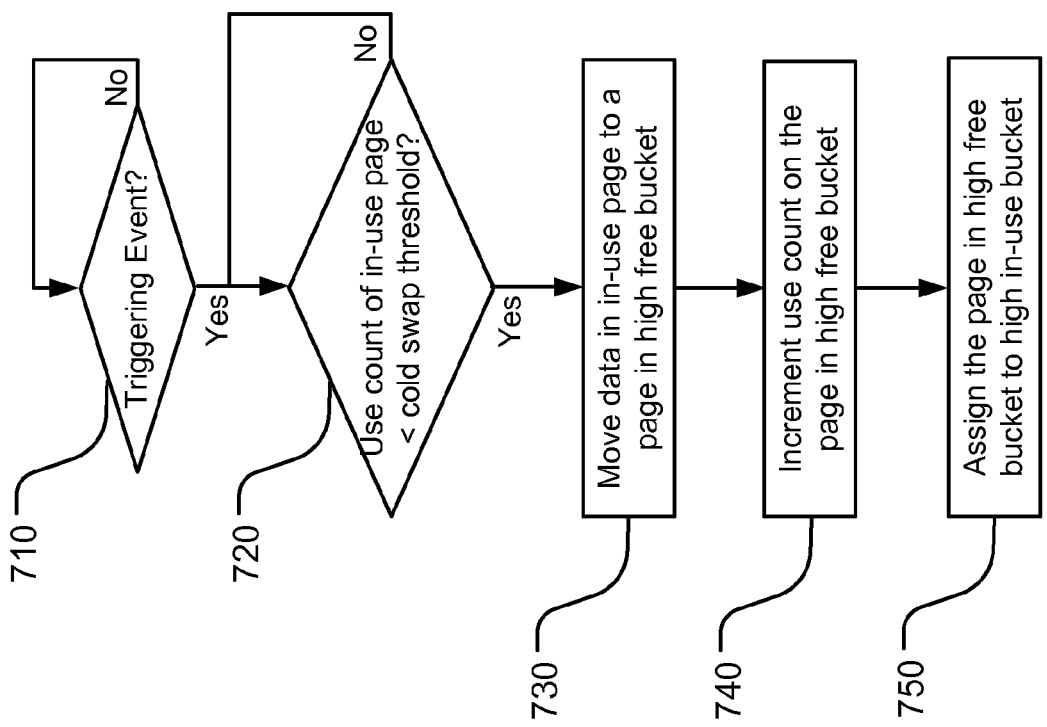
FIG. 7 is a flow chart for static wear leveling.

FIG. 7 is a flow chart for static wear leveling. In reference to FIG. 6 and FIG. 7, on a triggering event for a current in-use page 321a (710), the method determines whether the use count of the current in-use page 321a is less than a second threshold, such as a cold swap threshold (720), and if so the method moves data in the current in-use page 321a to a page, such as a last free page 319c, in the high free bucket 319 (730), thus making in-use page 321a available to data that need to be updated more frequently. The method increments the use count on the last free page 319c in the high free bucket 319 (740), and assigns the last free page 319c in the high free bucket 319 to the high in-use bucket 329 for a range of use counts corresponding to the high free bucket 319 (750).

The method maintains a use count cache 136 (FIG. 1), which has entries for in-use pages including use counts. The triggering event for the current in-use page can be creating or removing an entry for the current in-use page from the use count cache. The cold swap threshold may be determined experimentally, assigned, and adjusted by the system using the memory in accordance with system requirements for factors such as the relative use counts among the pages, the number of buckets, the granularity of wear leveling, and the complexity of the wear leveling method.

As described herein, the method maintains a use count cache 136 (FIG. 1), which has entries for in-use pages including use counts. To provide the operating system 120 (FIG. 1) with information including the most recently written in-use pages to perform wear leveling, entries for physical pages may need to be removed from the use count cache 136, or to be created in the use count cache 136. When an entry for a page is removed from the use count cache 136, the method assigns it to an in-use bucket based on the use count in the entry. For instance, if the use count in an entry for a page in the use count cache 136 is 3500, the method assigns the page to an in-use bucket that maintains in-use pages with use counts in a range from 3001 to 4000. When an entry for a page is created in the use count cache 136, the method assigns it a use count based on its in-use bucket. For instance, when an entry for a page is created in the use count cache 136, where the page is from an in-use bucket maintaining in-use pages with use counts in a range from 3001 to 4000, the method assigns it a use count based on its in-use bucket, such as 3500, or another use count between 3001 and 4000, inclusive.

In one embodiment, two algorithms manage memory pages based on the bucket-based data structures. Algorithm 1 may use the static wear leveling described herein to allocate a young page when a free page is needed. Algorithm 2 may use the dynamic wear leveling and the static wear leveling described herein to prevent old pages from being worn out by frequent updates. Pseudocode for Algorithm 1 and Algorithm 2 is reproduced below:

---

Algorithm 1

---

1: if F[b] ≠ 0 then
2:     p ← the last page in F[b]
3:     move p to the head of I[b]
4: else
5:     p ← the last page in I[b]
6:     q ← the last page in F[h]
7:     copy the data of p to q
8:     c[q] ← c[q] + 1
9:     move q to the head of I[h]
10: return p

---

Algorithm 2

---

1: if s ≠ (b + N − 1) mod N then
2:     perform update on q
3:     c[q] ← c[q] + 1
4:     if c[q] ≥ R then
5:         move q to the head of I[s + 1]
6:         c[q] ← 0
7: else
8:     if 0 < c[q] < R/2 then
9:         perform update on q
10:         c[q] ← c[q] + 1
11:     else
12:         p ← invoke free page allocation
13:         copy the data of q to p
14:         perform update on p
15:         move q to the head of F[s]
16:         c[p] ← c[p] + 1
17:         if c[p] ≥ R then
18:             move p to the head of I[b + 1]
19:             c[p] ← 0

---

In Algorithm 1, F[ ] represents the free list 310, and I[ ] represents the in-use list 320. b indicates the bucket index for the low free bucket and the low in-use bucket, and h indicates the bucket index for the high free bucket and the high in-use bucket. Accordingly, F[b] represents the low free bucket, and I[b] represents the low in-use bucket. p is a pointer to a free page to be returned by Algorithm 1. In Algorithm 2, q is a current in-use page to be updated. p is a pointer to a free page to be returned by Algorithm 1. b indicates the bucket index for the low in-use bucket, and s indicates the bucket index for page q. N is the number of buckets. R is a hot swap threshold. c[q] tracks the use count for the page q. "(b+N−1)mod N" is the index to the high in-use bucket.

When a free page is needed, it is allocated from either the low free bucket or the low in-use bucket. If the low free bucket is not empty, the algorithm moves the last page in the low free bucket F[b] to the head of the low in-use bucket I[b] (lines 1-3). Algorithm 1 then returns the last page in the low free bucket F[b] as a free page (line 10).

If the low free bucket is empty, Algorithm 2 moves data in the last page in the low in-use bucket I[b] to a last page in the high free bucket F[h], increments the use count on the last page in the high free bucket F[h], and assigns the last page in the high free bucket F[h] to the high in-use bucket I[h] for a range of use counts corresponding to the high free bucket F[h] (lines 5-9). Algorithm 1 then returns the last page in the low in-use bucket I[b] as a free page (line 10). Accordingly Algorithm 1 allocates a free page either from the low free bucket F[b] (lines 1-3), or from the low in-use bucket I[b] using static wear leveling by moving cold data to old pages (lines 5-9), and returns the free page p in the low in-use bucket I[b].

When a current in-use page q needs to be updated, Algorithm 2 may update the current in-use page q directly, or first swap the current in-use page q with a free page p, depending on whether the use count of the current in-use page q exceeds the hot swap threshold R.

If the bucket index s for the in-use page q is not equal to the bucket index "(b+N−1)mod N" for the high in-use bucket (line 1), Algorithm 2 updates the in-use page q directly (line 2), and increments by 1 the use count of the current in-use page q (line 3). After incrementing, if the use count of the current in-use page q equals or exceeds the hot swap threshold R (line 4), Algorithm 2 moves the in-use page q from the current bucket to the head of the next bucket I[s+1] with a higher range of use counts, and resets the use count to 0 to indicate that the data in the page at the head of the next bucket I[s+1] is moved there from a bucket with a lower range of use counts due to intensive updates (lines 4-6).

If the bucket index s for the in-use page q is equal to the bucket index "(b+N−1) mod N" for the high in-use bucket (line 1), the in-use page q is in the high in-use bucket and may have a use count exceeding the hot swap threshold. Algorithm 2 then tests if the use count c[q] of the current in-use page q is in a range of greater than 0 and less than half of the hot swap threshold (0<c[q]<R/2). If the use count c[q] is in the range, Algorithm 2 updates the in-use page q directly (line 9), and increments by 1 the use count of the current in-use page q (line 10).

If the use count c[q] of the current in-use page q in the high in-use bucket is 0, it implies that the current in-use page has been moved there from an in-use page with a use count exceeding the hot swap threshold R in a bucket with a lower range of use counts, in accordance with lines 4-6 of Algorithm 2 where the use count c[q] of the current in-use page q is reset to 0. If the use count c[q] of the current in-use page q in the high in-use bucket is equal to or greater than R/2, then the use count may exceed the hot swap threshold R. Accordingly, if the use count c[q] of the current in-use page q in the high in-use bucket is outside the range of (0<c[q]<R/2) (line 11), Algorithm 2 first allocates a free page p using Algorithm 1 which employs the static wear leveling (line 12). In accordance with Algorithm 1, the free page p is in the low in-use bucket I[b]. Algorithm 2 then employs the dynamic wear leveling (lines 13-16). In particular, Algorithm 2 moves data in the current in-use page q to the free page p (line 13), and performs update on the data moved to the page p (line 14). Algorithm 2 then frees the current in-use page q, and assigns the freed page q to the head of the high free bucket F[s] for a range of use counts corresponding to the high in-use bucket I[s] (line 15).

Algorithm 2 increments the use count by 1 on the page p (line 16). After incrementing, if the use count of the current in-use page p equals or exceeds the hot swap threshold R (line 17), Algorithm 2 moves the in-use page p from the current in-use bucket I[b] to the head of the next in-use bucket I[b+1] with a higher range of use counts, and resets the use count to 0 to indicate that the data in the page at the head of the bucket I[b+1] is moved there from a bucket with a lower range of use counts due to intensive updates (lines 17-19).

Figure 8:
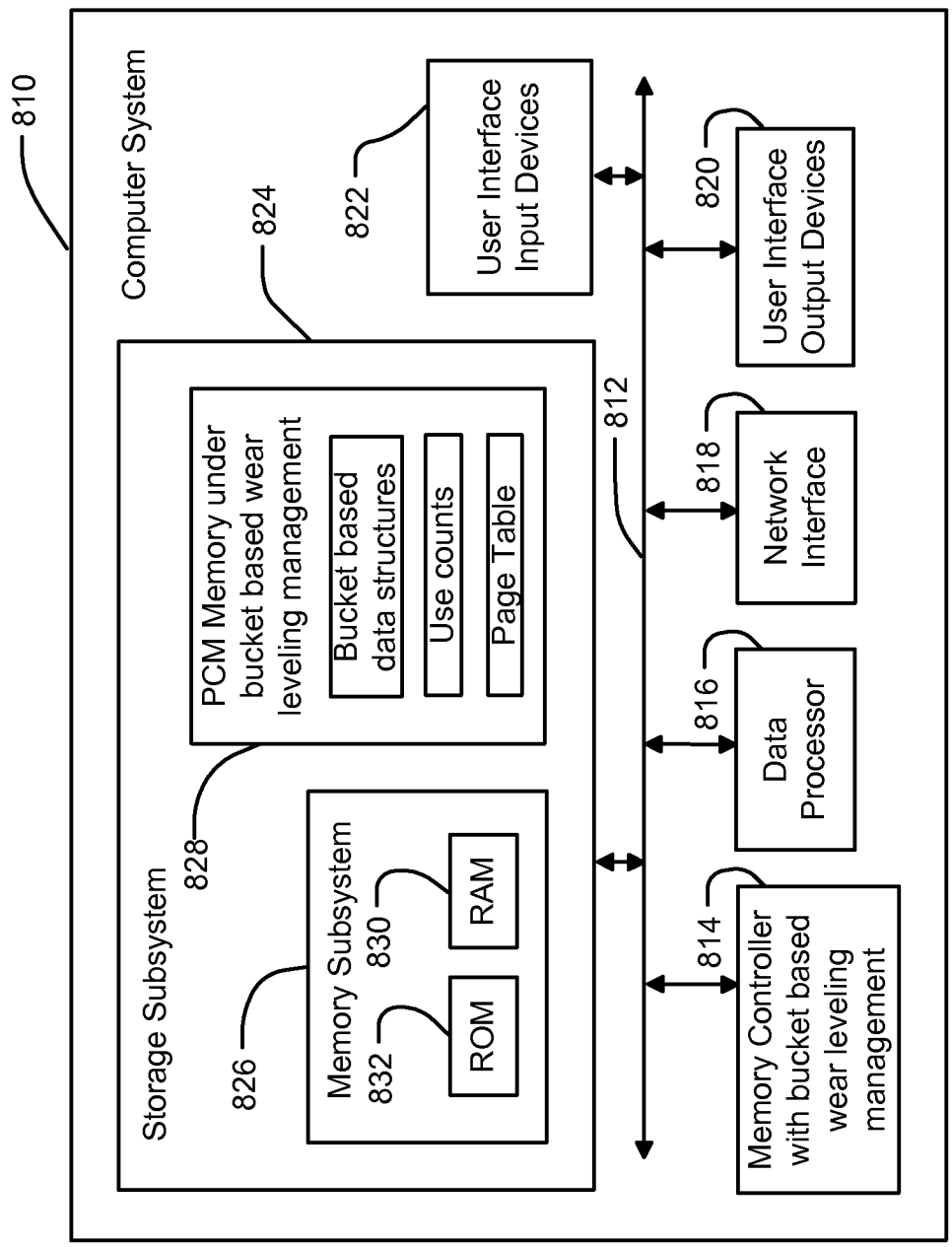
FIG. 8 is a block diagram of an example computer system

FIG. 8 is a block diagram of an example computer system 810, according to one implementation. Computer system 810 may include a storage subsystem 824 including a memory 828 including a plurality of pages, and a memory controller 814 coupled to at least the memory 828.

The memory 828 may be under bucket-based dynamic and static wear leveling memory management. The memory 828 may store bucket-based data structures for bucket-based wear leveling including the in-use buckets and the free buckets, the use counts for the in-use pages in the in-use buckets, and a page table, such as the page table 142 described with FIG. 1.

The memory 828 may include phase change memory materials, like chalcogenides, and other programmable resistance materials. Phase change memory materials may include alloys of materials such as germanium (Ge), antimony (Sb), tellurium (Te), gallium (Ga), indium (In), silver (Ag), selenium (Se), thallium (Ti), bismuth (Bi), tin (Sn), copper (Cu), palladium (Pd), lead (Pb), sulfur (S), and gold (Au). Phase change materials include $Ge_xSb_xTe_x$ materials in general. Other programmable resistance memory can be used as well, including metal oxide memory, flash memory, electrolytic conductive bridge memory, and so on.

The memory controller 814 includes programs or other logic to perform memory management using bucket-based dynamic wear leveling and static wear leveling. In particular, the memory controller 814 includes logic to assign in-use pages to in-use buckets according to use counts. The in-use buckets include a low in-use bucket for a lowest range of use counts, and a high in-use bucket for a highest range of use counts. The memory controller 814 includes logic to assign free pages to free buckets according to use counts. The free buckets include a low free bucket for a lowest range of use counts, and a high free bucket for a highest range of use counts. The memory controller 814 includes logic to maintain use counts for in-use pages. For dynamic wear leveling, the memory controller 814 includes logic to, on a triggering event for a current in-use page, determine whether the use count of the current in-use page exceeds a hot swap threshold, and if so move data in the current in-use page to a page, such as a lead page, in the low free bucket, and free the current in-use page. For static wear leveling, the memory controller 814 includes logic to, on a triggering event for a current in-use page, determine whether the use count of the current in-use page is less than a cold swap threshold, and if so move data in the current in-use page to a page, such as a last page, in the low free bucket.

The memory controller 814 may include a memory management unit 130, and the lifetime aware management 124 (FIG. 1). The example computer system 810 and/or the memory controller 814 may include logic to perform other tasks as set forth in the description for the method for memory management for a memory including a plurality of pages.

The memory 828 under bucket-based dynamic and static wear leveling management may be on an integrated circuit, wherein the memory controller 814 includes logic on the integrated circuit. Computer system 810 may include a data processor 816, wherein the memory controller 814 includes logic on the data processor 816. For example, the logic may include algorithms such as Algorithm 1 and Algorithm 2 described herein using the dynamic wear leveling and static wear leveling to prevent old pages from being worn out by frequent updates.

The data processor 816 communicates with a number of peripheral devices via bus subsystem 812. These peripheral devices may include the storage subsystem 824 including, for example, memory devices such as ROM and RAM, and the memory 828 with wear leveling, user interface input devices 822, user interface output devices 820, and a network interface subsystem 818. The input and output devices allow user interaction with computer system 810. Network interface subsystem 818 provides an interface to outside networks.

User interface input devices 822 may include a keyboard; pointing devices such as a mouse, trackball, touchpad, or graphics tablet; a scanner; a touchscreen incorporated into the display; audio input devices such as voice recognition systems and microphones; and other types of input devices. In general, use of the term "input device" is intended to include all possible types of devices and ways to input information into computer system 810.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules and methods described herein. These software modules are generally executed by data processor 816 alone or in combination with other processors.

Memory subsystem 826 used in the storage subsystem 824 can include a number of memories including a main random access memory (RAM) 830 for storage of instructions and data during program execution and a read only memory (ROM) 832 in which fixed instructions are stored. The storage subsystem 824 can provide persistent storage for program and data files, and may include a hard disk drive, a floppy disk drive along with associated removable media, a CD-ROM drive, an optical drive, or removable media cartridges. The modules implementing the functionality of certain implementations may be stored in the storage subsystem 824, or in other machines accessible by the processor.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as one example. Many other configurations of computer system 810 are possible having more or fewer components than the computer system depicted in FIG. 8.

The present application provides a method for memory management for a memory including a plurality of pages. The method includes assigning in-use pages to in-use buckets according to use counts, including a low in-use bucket for a lowest range of use counts, and a high in-use bucket for a highest range of use counts. The method includes assigning free pages to free buckets according to use counts, the free buckets including a low free bucket for a lowest range of use counts, and a high free bucket for a highest range of use counts. The method includes maintaining use counts for in-use pages. The method includes, on a triggering event for a current in-use page, determining whether the use count of a current in-use page in an in-use bucket exceeds a threshold, and if so moving data in the current in-use page to a page in the low free bucket.

These and additional implementations can include one or more of the following features. The low free bucket may include a list of free pages, and the page in the low free bucket may be a lead page in the list. The method may further include freeing the current in-use page, and assigning the freed current in-use page to a free bucket for a range of use counts corresponding to the in-use bucket. The method may maintain a use count cache, having entries for in-use pages including use counts, and wherein the triggering event for the current in-use page is removing an entry for the current in-use page from the use count cache.

The method may further include, on a triggering event for a current in-use page, determining whether the use count of the current in-use page is less than a second threshold, and if so moving data in the current in-use page to a page in the high free bucket. The high free bucket may include a list of free pages, and the page in the high free bucket may be a last page in the list. The method may include assigning the page in the high free bucket to an in-use bucket for a range of use counts corresponding to the high free bucket. The method may include maintaining a use count cache, having entries for in-use pages including use counts, and wherein the triggering event for the current in-use page is removing an entry for the current in-use page from the use count cache.

The method may include maintaining a use count cache, having entries for in-use pages including use counts, when an entry for a page is removed from the use count cache, assigning it to an in-use bucket based on the use count in the entry, and when an entry for a page is created in the use count cache, assigning it a use count based on its in-use bucket.

The in-use buckets and the free buckets may include respective linked lists of pages including lead pages. The method may include maintaining a translation lookaside buffer TLB for addressing pages in the memory, and maintaining a use count cache including entries for pages resident in the TLB.

The method may include assigning the freed page to a free bucket for a range of use counts corresponding to the in-use bucket. Maintaining use counts for in-use pages may include incrementing the use count in an entry for a page on an erase of data in the page.

The present application provides an apparatus including a memory including a plurality of pages, and a memory controller coupled to the memory. The memory controller includes logic to assign in-use pages to in-use buckets according to use counts, including a low in-use bucket for a lowest range of use counts, and a high in-use bucket for a highest range of use counts; logic to assign free pages to free buckets according to use counts, the free buckets including a low free bucket for a lowest range of use counts, and a high free bucket for a highest range of use counts; logic to maintain use counts for in-use pages; and logic which determines whether the use count of a current in-use page in an in-use bucket exceeds a threshold, and if so moves data in the current in-use page to a page in the low free bucket.

These and additional implementations can include one or more of the following features. The low free bucket may include a list of free pages, and the page in the low free bucket may be a lead page in the list. The memory controller may include logic to free the current in-use page, and to assign the freed current in-use page to a free bucket for a range of use counts corresponding to the in-use bucket. The memory controller may include a use count cache, having entries for in-use pages including use counts, and wherein the triggering event for the current in-use page is removing an entry for the current in-use page from the use count cache.

The memory controller may further include logic, which on a triggering event for a current in-use page, determines whether the use count of the current page is less than a second threshold, and if so moves data in the current in-use page to a page in the high free bucket. The high free bucket may include a list of free pages, and the page in the high free bucket is a last page in the list. The memory controller may include logic which assigns the page in the high free bucket to an in-use bucket for a range of use counts corresponding to the high free bucket. The memory controller may include a use count cache, having entries for in-use pages including use counts, and wherein the triggering event for the current in-use page is removing an entry for the current in-use page from the use count cache.

The memory controller may include a use count cache, having entries for in-use pages including use counts, including logic which, when an entry for a page is removed from the use count cache, assigns it to an in-use bucket based on the use count in the entry, and including logic which, when an entry for a page is created in the use count cache, assigns it a use count based on its in-use bucket.

In the apparatus, the in-use buckets and the free buckets may include respective linked lists of pages including lead pages. The apparatus may include a translation lookaside buffer TLB for addressing pages in the memory, and a use count cache including entries for pages resident in the TLB. The apparatus may include logic which assigns the freed page to a free bucket for a range of use counts corresponding to the in-use bucket. The apparatus may include logic which increments the use count in an entry for a page on an erase of data in the page.

The memory in the apparatus may be on an integrated circuit, and the memory controller may include logic on the integrated circuit. The apparatus may further include a data processor, wherein the memory controller includes logic on the data processor. The apparatus may further include a page table, wherein the memory may store the in-use buckets, the free buckets, the use counts for the in-use pages in the in-use buckets, and the page table. The memory may include phase change memory materials.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for memory management for a memory including a plurality of pages, wherein each page in the plurality has a use count, comprising:

assigning in-use pages to in-use buckets according to use counts, including a low in-use bucket for a lowest range of use counts, and a high in-use bucket for a highest range of use counts;

assigning free pages to free buckets according to use counts the free pages, the free buckets including a low free bucket for a lowest range of the use counts of the free pages, and a high free bucket for a highest range of the use counts of the free pages;

maintaining use counts for in-use pages in a use count cache having entries for in-use pages including use counts; and determining whether the use count of a current in-use page in an in-use bucket exceeds a threshold, and if so moving data in the current in-use page to a page in the low free bucket.

2. The method of claim 1, including freeing the current in-use page, and assigning the freed current in-use page to a free bucket for a range of use counts corresponding to the in-use bucket.

3. The method of claim 1, wherein said determining is performed in response to a triggering event that relates to an operation on the current in-use page.

4. The method of claim 3, wherein said triggering event for the current in-use page is removing an entry for the current in-use page from the use count cache.

5. The method of claim 1, including determining whether the use count of the current in-use page is less than a second threshold, and if so moving data in the current in-use page to a page in the high free bucket.

6. The method of claim 5, including assigning the page in the high free bucket to an in-use bucket for a range of use counts corresponding to the high free bucket.

7. The method of claim 5, wherein said determining whether the use count of the current in-use page is less than a second threshold is performed in response to a triggering event that relates to an operation on the current in-use page.

8. The method of claim 7, wherein said triggering event for the current in-use page is removing an entry for the current in-use page from the use count cache.

9. The method of claim 1, when an entry for a page is removed from the use count cache assigning it to an in-use bucket based on the use count in said entry, and when an entry for a page is created in the use count cache, assigning it a use count based on its in-use bucket.

10. An apparatus, comprising:
a memory including a plurality of pages, wherein each page in the plurality has a use count; and
a memory controller coupled to the memory, including logic to assign in-use pages to in-use buckets according to use counts, including a low in-use bucket for a lowest range of use counts, and a high in-use bucket for a highest range of use counts; logic to assign free pages to free buckets according to use counts of the pages, the free buckets including a low free bucket for a lowest range of use of the free pages, and a high free bucket for a highest range of the use counts of the free pages; logic to maintain use counts for in-use pages in a use count cache having entries for in-use pages including use counts; and logic which determines whether the use count of a current in-use page in an in-use bucket exceeds a threshold, and if so moves data in the current in-use page to a page in the low free bucket.

11. The apparatus of claim 10, wherein the memory controller includes logic to free the current in-use page, and to assign the freed current in-use page to a free bucket for a range of use counts corresponding to the in-use bucket.

12. The apparatus of claim 10, wherein said logic which determines whether the use count of a current in-use page in an in-use bucket exceeds a threshold executes in response to a triggering event that relates to an operation on the current in-use page.

13. The apparatus of claim 12, wherein said triggering event for the current in-use page is removing an entry for the current in-use page from the use count cache.

14. The apparatus of claim 10, the memory controller including logic which determines whether the use count of the current page is less than a second threshold, and if so moves data in the current in-use page to a page in the high free bucket.

15. The apparatus of claim 14, the memory controller including logic which assigns the page in the high free bucket to an in-use bucket for a range of use counts corresponding to the high free bucket.

16. The apparatus of claim 14, wherein said logic which determines whether the use count of a current in-use page is less than a second threshold executes in response to a triggering event that relates to an operation on the current in-use page.

17. The apparatus of claim 16, wherein said triggering event for the current in-use page is removing an entry for the current in-use page from the use count cache.

18. The apparatus of claim 10, the memory controller including logic which when an entry for a page is removed from the use count cache assigns it to an in-use bucket based on the use count in said entry, and which when an entry for a page is created in the use count cache, assigns it a use count based on its in-use bucket.

19. The apparatus of claim 10, wherein the memory is on an integrated circuit, and the memory controller comprises logic on the integrated circuit.

20. The apparatus of claim 10, wherein the memory comprises memory cells including phase change memory materials.

* * * * *